Feb. 25, 1964
J. PERRELLI ETAL
3,122,186
FREESTONE DRUPE PITTER
Filed July 22, 1960
5 Sheets-Sheet 1
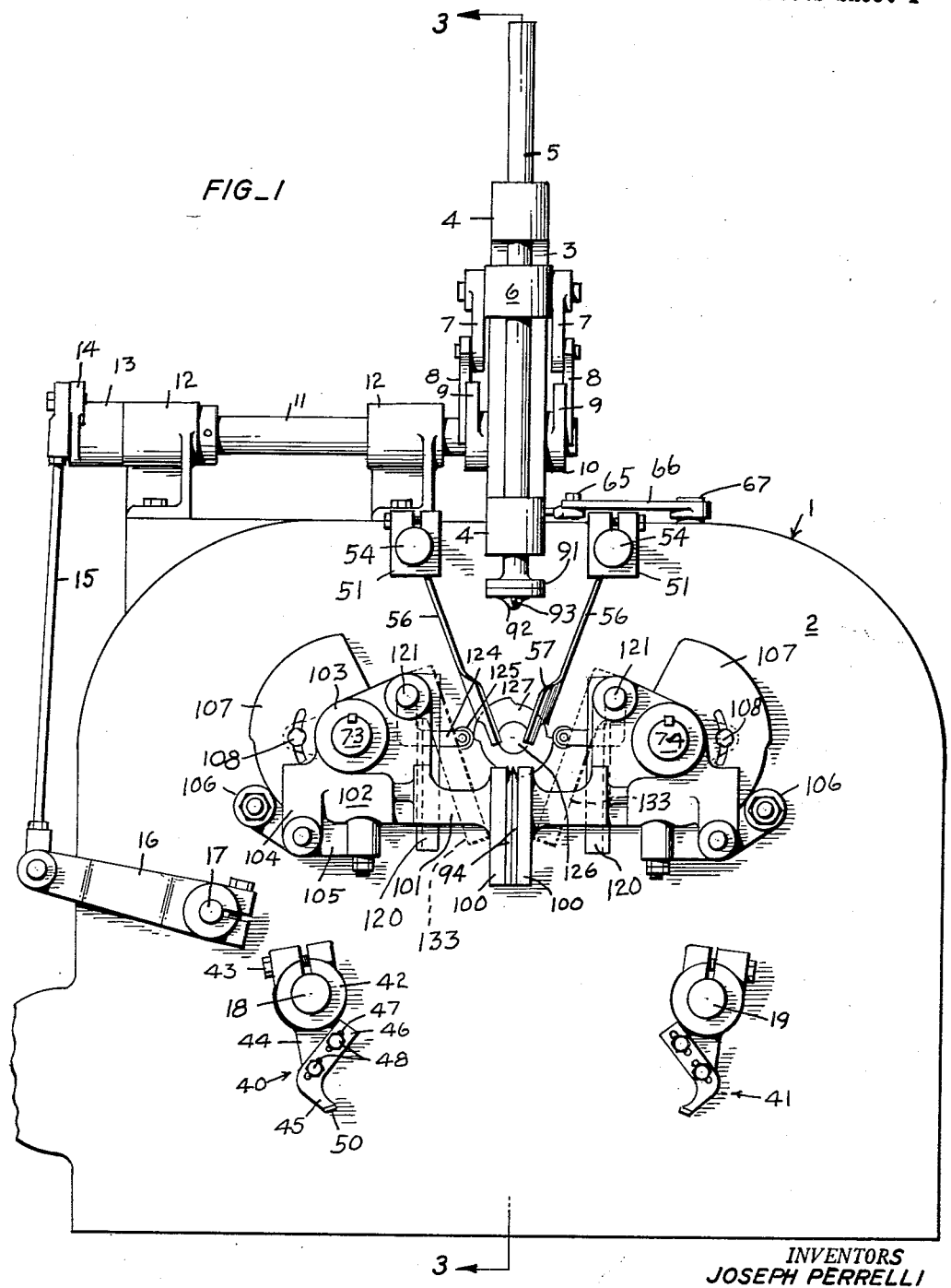
FIG_1
INVENTORS
JOSEPH PERRELLI
GEORGE E. KILNER
BY
Boyken, Mohler + Wood
ATTORNEYS.

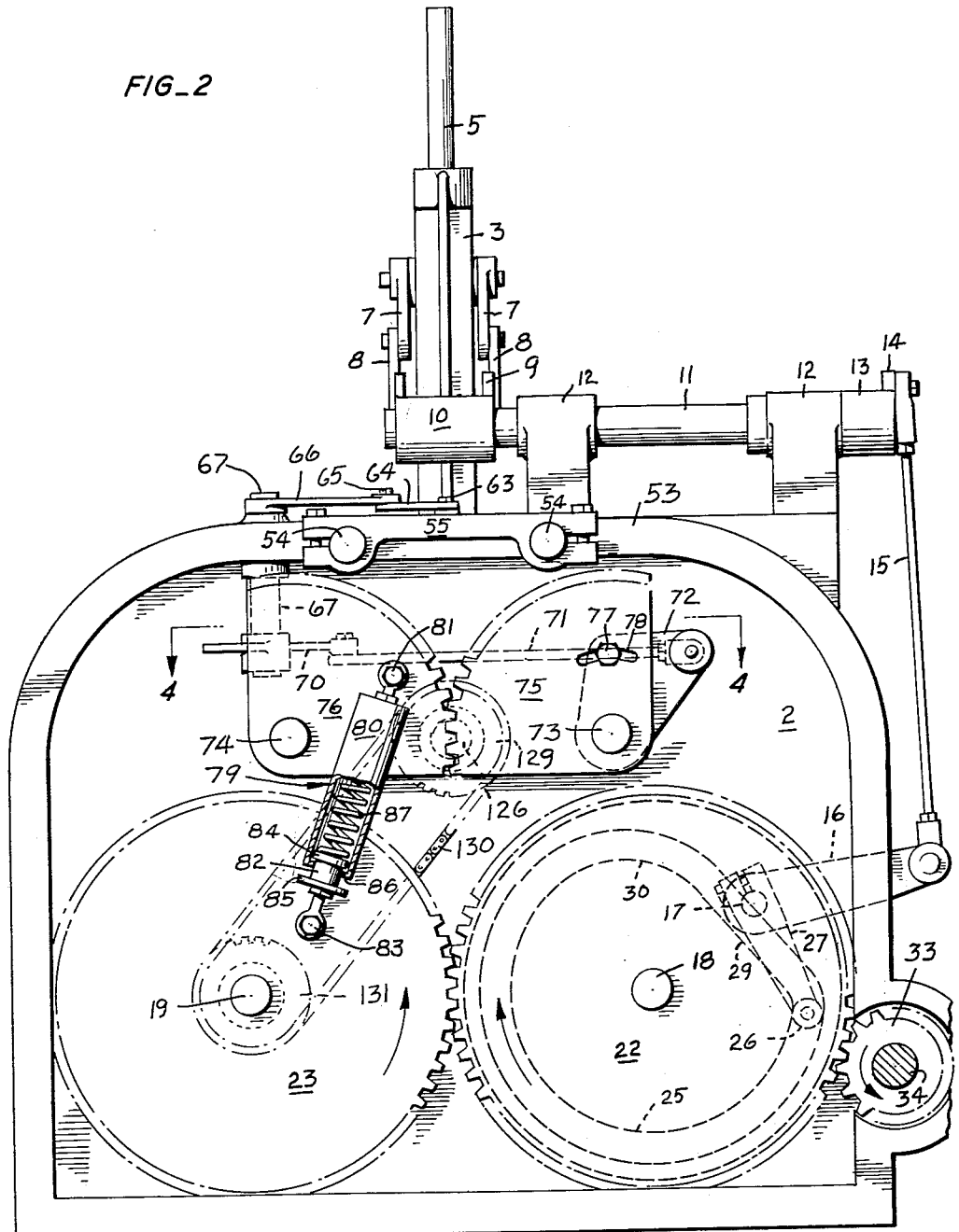

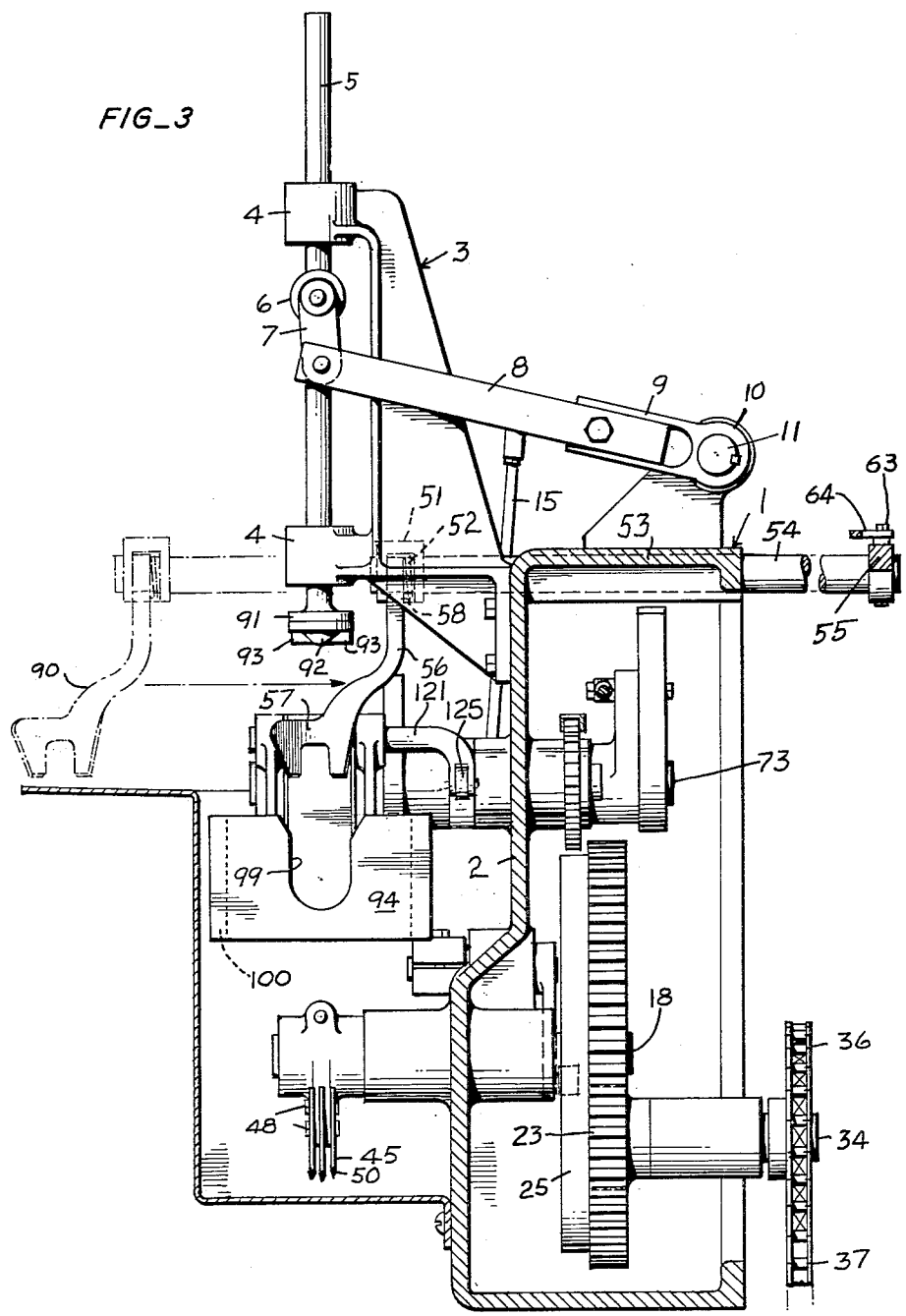

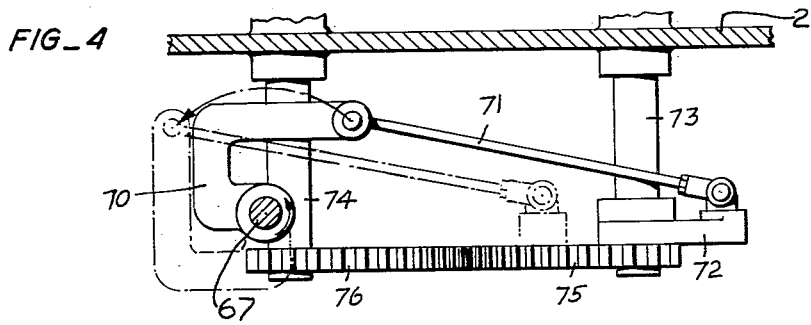
FIG_4
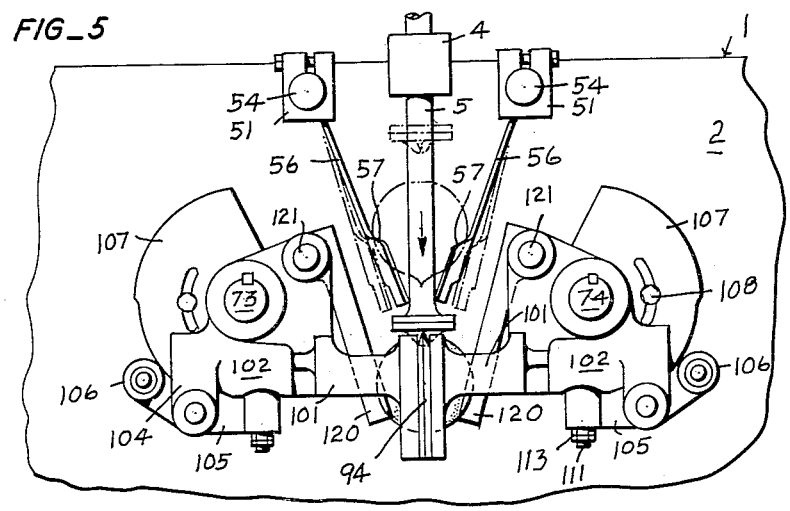
FIG_5
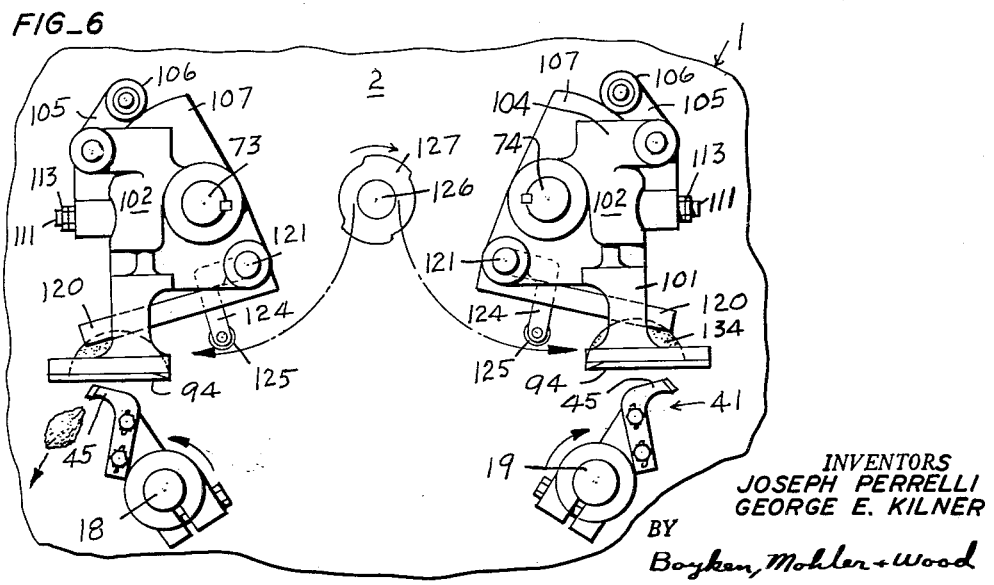
FIG_6
INVENTORS
JOSEPH PERRELLI
GEORGE E. KILNER
BY
Boyken, Mohler + Wood
ATTORNEYS

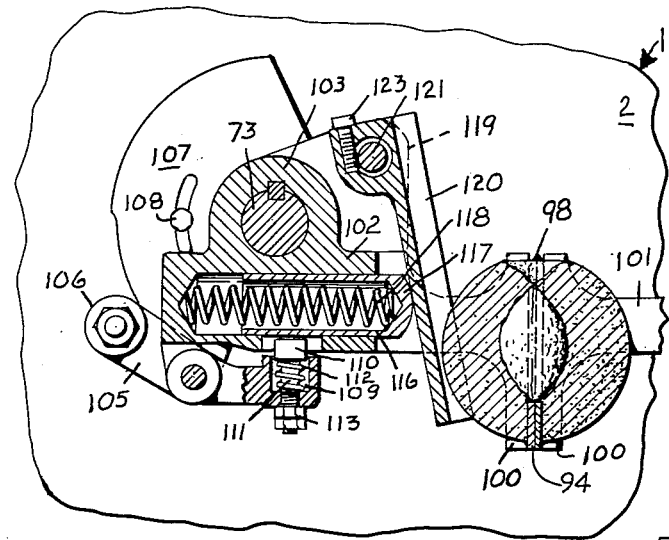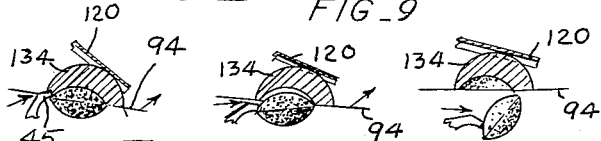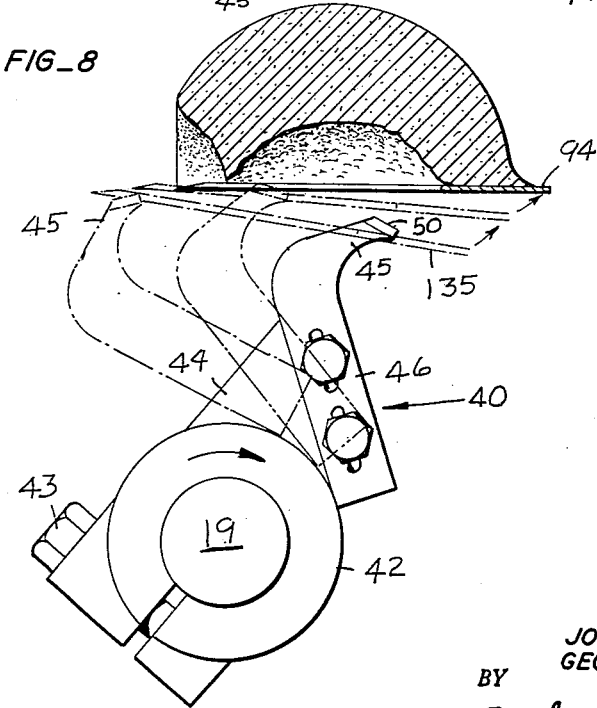

United States Patent Office 3,122,186
Patented Feb. 25, 1964

3,122,186
FREESTONE DRUPE PITTER
Joseph Perrelli, El Cerrito, and George E. Kilner, Oakland, Calif., assignors to Perrelli Freestone Machine, Inc., San Leandro, Calif.
Filed July 22, 1960, Ser. No. 44,644
10 Claims. (Cl. 146—28)

This invention relates to a freestone pitter for drupes; particularly peaches, and has for one of its objects the provision of a pitter that will halve and pit freestone peaches without injury to the fruit, and that is more efficient than pitters heretofore employed for the pitting of freestone peaches.

Another object of the invention is the provision of an improved method of pitting freestone drupes.

In the present invention each whole freestone peach is bisected by a cutter that comprises two relatively thin, flat blades positioned face to face to virtually form a single blade, and which blades are bevelled along one of their corresponding edges to form a substantially single cutting edge. A recess is formed in the blades to receive the pit during the bisecting step and then the two blades are moved apart with each of the peach halves yieldably held stationary against the respective blades. The pit will remain adhered in the pit cavity of one of the two halves, and the direction of movement of the halves is such that one edge (normally the stem end) will be trailing, while the blossom end will be leading.

At a point in the path of travel of the peach half carrying the pit, a claw-like member moves in the same general direction of the peach half, at a slightly faster speed than the half, and hooks over the trailing end of the pit. As soon as the half is so hooked at its trailing end, the claw-like pit engaging member and the fruit half start moving divergently away from each other thereby causing the pit to be progressively pulled out of the pit cavity without mutilating the flesh around the cavity.

By the above method, the peach halves are not slid over plates, as has been done heretofore, nor is the pit moved into the flesh of the peach half during removal of the pit.

It is one of the objects of the invention to provide a pitter adapted to carry out the method above described, and which pitter is compact, rugged, reliable, economical to maintain, rapid in operation, and safe to operate.

It may be added that it is highly desirable to avoid applying any substantial pressure against freestone peach halves. In the present instance only sufficient pressure is applied to the peach halves to hold them against the bisecting blades. The peach holders are yieldably mounted to receive different sized peaches and to hold them in a predetermined position during bisecting of the flesh, but once the pit engaging member moves into engagement with the pit, the holders that hold the half are locked against movement away from the peach half, and no additional pressure to the peach half is applied by the holder.

Another object of the invention is the provision of a freestone peach pitter that will remove whole or split pits from bisected peaches. Hence, if the halves of a split pit are in each of the peach halves, the pitter will remove both pit halves in the same manner as it removes a whole pit from one of the halves.

Other objects and advantages will appear in the description and in the drawings.

In the drawings FIG. 1 is a front elevational view of the pitting mechanism in a position preparatory to delivery thereto of a fruit body, such as a freestone peach and the like.

FIG. 2 is a rear view of the pitter as seen from the side thereof opposite to the side seen in FIG. 1.

FIG. 3 is a sectional view taken along line 3—3 of FIG. 1.

FIG. 4 is a fragmentary sectional view taken along line 4—4 of FIG. 2.

FIG. 5 is a fragmentary front elevational view of the peach receiving and impaling mechanism seen in FIG. 1 but in a position in which the body of a peach has been moved to a position impaled on a pair of face to face adjoining fruit bisecting blades preparatory to moving the bisected halves apart.

FIG. 6 is a view similar to that of FIG. 5 with the bisected peach halves separated and the pit ejected or removed from the half carrying it.

FIG. 7 is an enlarged, sectional view taken through the peach impaling and bisecting blades at right angles to the planes of the latter and through one of the peach holders and carriers.

FIG. 8 is an enlarged sectional view of one of the peach impaling blades and pit remover in the final pitting position, the pit having been removed from the peach half. Two successive positions from and including the initial engagement of the pit by the pit remover to the position shown in full line, are indicated in dot-dash lines.

FIG. 9 is a semi-diagrammatic view of several stages in the removal of a pit from a peach half.

In the description, the front side of the pitter is the side at which the peach is pitted, therefore the words "front," "forward," "rear," "rearwardly," and any other words of similar import are used to designate parts or movements relative to said front side of the machine.

Said pitter includes a frame, generally designated 1, that is adapted to be supported stationary in any desired position, but with the front side 2, as seen in FIG. 1, being substantially vertically disposed. Said frame may be formed to provide a housing within which certain gears and working parts are positioned, the latter being at the rear of said front side.

Bolted to the side 2 at the upper portion thereof is an upstanding bracket 3 (FIG. 3) provided with a pair of vertically aligned and vertically spaced bearings 4 that support a vertical rod 5 for vertical reciprocable movement.

A block 6 is secured to rod 5 intermediate bearings 4, and a pair of vertically disposed links 7 (FIGS. 2, 3) at opposite sides of block 6 and rod 5 are pivotally connected at their upper ends with said block. The lower ends of links 7 are respectively pivotally connected with one of the ends of a pair of arms 8, which arms 8 are in turn secured to a pair of arms 9 that project laterally from a sleeve 10 (FIG. 2) and that are rigid with said sleeve. This sleeve 10 (FIGS. 2, 3) is keyed to a horizontally disposed shaft 11, which shaft is supported for oscillatory movement about its axis in a pair of bearings 12. Shaft 11 is above the frame 1 and bearings 12 are bolted to the upper side of said frame (FIG. 1).

Shaft 11 projects outwardly of the pair of bearings 12 at its opposite ends, one end projecting outwardly of frame 1, and which latter end has a collar 13 secured thereto. An arm 14, rigid with said collar extends radially outwardly therefrom and is pivotally connected at its outer end with the upper end of a rod 15. The lower end of rod 15 is pivotally connected with the outer end of an arm 16, the inner end of which is adjustably secured to a shaft 17. Shaft 17 is journalled for rotation in a bearing formed on the front side 2 of frame 1.

A pair of horizontally spaced bearings carried by front side 2 of the frame 1 support horizontal shafts 18, 19 for rotation, and gears 22, 23 (FIG. 2) at the rear side of plate 2, which is the front side of the frame 1, are secured on said shafts. The teeth of gears 22, 23 are in mesh with each other, and gear 22 has a forwardly opening cam track 25 (FIGS. 2, 3) on its forward side.

A cam follower 26 is in cam track 25, which follower is secured on one end of an arm 27. The other end of arm 27 is secured to the shaft 17. The said cam track 25 is concentric with the axis of shaft 18 for most of its length, but is formed at one side with a straight chord section 29 that relatively abruptly connects with one end of the annular track portion, and that connects at its other end with the other end of said annular track portion by relatively gradual curved portion 30.

Gears 22, 23 are caused to rotate by a pinion 33 (FIG. 2) the teeth of which are in mesh with the teeth of gear 22. Said pinion is secured to a shaft 34, which shaft is rotatably supported on frame 1. Shaft 34 has a sprocket wheel 36 (FIG. 3) secured thereto, and a chain 37 extending over said wheel connects with a source of power (not shown) such as a motor or any conventional power transmission means driven by such motor.

The direction of rotation of gears 22, 23 is such that their connected sides will move upwardly.

Secured to the forward ends of shafts 18, 19 at the forward side of the front wall 2 are the pit engaging and removing mechanisms generally designated 40, 41 (FIG. 1). These mechanisms are alike, except for right and left, hence a description of one will suffice for both.

Referring to shaft 18, the mechanism 40 includes a split collar 42 clamped onto shaft 18 by a bolt 43. Arm 44 projects radially outwardly from the side of collar 42 that is opposite to bolt 43, and adjustably secured to the outer end of said collar is the pit engaging means that comprises a plurality of flat sided blade-like elements in parallel spaced, opposed relation. Each element includes a claw-like finger 45 (FIGS. 1, 3, 8) that extends substantially at right angles to an elongated shank 46, the latter being formed with a pair of slots 47 extending longitudinally thereof. Bolts 48 extend through said slots and adjustably secure the shanks to arm 44. The positions of the shanks 46 are such that the fingers 45 preferably extend therefrom generally in the direction of their movement upon rotation of shaft 18. The angle at which each finger extends relative to a radial line from shaft 18 is approximately 45 degrees. The outer ends of the blade-like fingers 45 terminate in short straight sharpened edges 50 that may extend at approximately right angles to the longitudinal axis of arm 44.

In FIG. 3 the fingers 45 and shanks 46 are seen edgewise with their flat sides disposed in parallel planes that are perpendicular to the axis of rotation of shaft 18. As will later be explained, these fingers 45 will enter the fruit at the stem end of the pit for a short distance only in order to engage the pit, and the very slight slits formed by said fingers in entering the fruit will be imperceptible in the cooked fruit. It should be noted that the fingers 45 do not remove any of the fruit, nor do they crush the fruit.

The bolts 48 and the provision of slots 47 in the flat shanks 46 enable adjustment of the fingers 45 relative to each other so their pit engaging edges may be positioned to substantially engage the convexly curved edge of a pit at the stem end thereof at their spaced points, thus insuring against an objectionable displacement of the pit after engagement with the fingers that might tend to mutilate the flesh of the peach.

The movement of fingers 45 upon rotation of shafts 18, 19 will be edgewise in annular, coplanar paths at opposite sides of a vertical plane that is parallel with the axes of revolution of said claws, and which plane bisects the vertical axis of the vertical shaft 5. Also said claws will move upwardly at the adjacent sides of their paths, so that the claws carried by shaft 18 will move counterclockwise, while the claws carried by shaft 19 will move clockwise, as seen in FIG. 1.

Reciprocably supported in bearings formed in the upper side of frame 1 are a pair of horizontally spaced, parallel rods 54 (FIGS. 1, 2, 3) that project both rearwardly and forwardly of frame 1. The rear ends of these rods are connected by a cross head 55, and the forward end of each rod 54 carries a depending arm 56 that is rotatable on each rod within a stationary split clamp block 51 (FIG. 3). A torsion spring 52 reacting between block 51 and the upper end of arm 56 yieldably urges said arm against a stop 58 to limit the movement of the lower end portions of said arms toward each other. Said lower end portions are generally U shape in horizontal arm sectional contour for engaging and centering a peach between them, hence said lower end portions may be designated peach holding elements 57.

The pair of fruit holding elements 57 on the pair of rods 54, including arms 56, extend convergently downwardly from the upper ends of said arms. The blocks 51 that pivotally support the arms 56, and from which they are suspended, are adjustable to regulate the spacing between the holders 57 and to insure holding a fruit body centrally below rod 5.

By the above structure an operator at the forward side of the machine may, in a simple, natural movement, quickly position a peach in the holder from above at a point remote from the bisecting blades, and such holder will permit the fruit to be pushed downwardly onto the bisecting blades when the fruit is carried back to a position below rod 5.

The reciprocable movement of the holder also adapts it to receive fruit from a mechanical feeder or other source.

The peach holder described above will obviously hold the peach in an oriented position so it will not become accidentally displaced, and will also securely hold it during any downward movement thereof. As will later be described more in detail, the operator preferably positions a peach in the holder so its stem end is upward and its suture is in a plane bisecting the space between said elements 57.

Secured to the cross head 55 centrally between rods 54 is a vertical pivot 63 (FIGS. 2, 3) connected with one end of a horizontally disposed link 64. The opposite end of link 64 is pivotally connected at 65 with the outer end of an arm 66 (FIG. 2). The inner end of arm 66 is secured to the upper end of a vertical shaft 67 that is supported for rotation in a bearing formed on the upper wall 53 of frame 1.

The lower end of shaft 67 is secured to a crank arm 70 (FIGS. 2, 4) and the outer end of said arm 70 is pivotally connected to one end of a rod 71. The other end of rod 71 is pivotally connected to the outer end of an arm 72 (FIG. 2) that, in turn, is secured on one of the ends of a horizontal shaft 73 (FIG. 2).

The shaft 73 is one of a horizontal pair thereof that are supported in parallel, horizontally spaced relation above shafts 18, 19. The other shaft of said pair is designated 74 (FIG. 2).

These shafts 73, 74 project from the forward side of the front wall 2, (FIG. 1) but arm 72 and the linkage connecting it with shaft 67 are at the rear side of said wall. Also at the rear side of said wall 2 and respectively on shafts 73, 74 are gear segments 75, 76 (FIG. 2) the segment 75 being on shaft 73, and segment 76 being on shaft 74. A bolt 77 extends through an arcuate slot 78 in segment 75 and into arm 72 for adjustably securing the segment 75 to arm 72. The teeth of the segments 75, 76 are in mesh with each other, hence rotation of one will cause rotation of the other, and, as shafts 73, 74 are secured to said gear segments, the said shafts will also be rotated.

The gear segment 76 is connected with gear 23 by a special lost motion link generally designated 79 (FIG. 2). The latter includes a cylinder 80 pivotally connected at one end thereof to segment 76 at 81. Reciprocably extending into the other end of cylinder 80 is a member 82 that is pivotally connected at its other end at 83 with the gear 23. This member 82 is formed with a pair of spaced radially outwardly projecting flanges 84, 85 at opposite sides of an inwardly directed flange 86 formed on the end of the cylinder 80 through which the member 82 projects. A helical spring 87 within cylinder 80 reacts against the member 82 and the end of the cylinder opposite thereto for yieldably urging the flange 84 on member 80 toward flange 86.

Upon rotation of shaft 19, the segments 75, 76 will have an oscillatory movement, and there will be a substantial dwell of segments 75, 76 during the point where the link moves past a center line extending between shaft 19 and pivot 81, the period of which dwell may be varied by varying the position of member 82. The closer the flange 84 is adjusted by the adjusting nuts at the ends of the cylinder toward the end flange 86 on cylinder 80 when the link is at dead center, the closer the link will approach that of a solid line in its operation.

The "dwell," above mentioned, occurs when the fruit bisecting blades are together, as will later be described more in detail in the operation of the pitter.

From the foregoing, it will be seen that the reciprocable movement of rods 54 is derived from shaft 19 and its connection with shaft 34 through gears 22, 23 and pinion 33. Upon one rotation of shafts 18, 19 the fruit carrier or holder will be moved from the full line position of FIG. 3 to the extended front receiving position 90 indicated in dot-dash lines and back to the full line position in time for the rod 5 to descend to engage the stem end of the fruit and push it downwardly through the fruit holder to a position below the latter.

The lower end of the shaft 5 has a head 91 thereon that carries a downward central projection 92 having downwardly directed blades 93 at opposite sides thereof that are adapted to cut into the flesh of the peach in the plane of its suture at its stem end only upon the projection 92 engaging the stem end of the pit in the depression that marks the stem end of the fruit.

The forwardly projecting ends of shafts 73, 74 have fruit impaling or bisecting blades 94 carried thereby. These blades, as seen in FIG. 7, have upwardly directed cutting edges 98 and are bevelled at their oppositely outwardly facing sides along said edges so as to virtually form a single blade with a single cutting edge when said pair are flat together. Each blade is correspondingly cut away centrally thereof along its upper edge to form registering recesses 99 (FIG. 3) to receive a pit when a peach is impaled on the blades for bisecting the flesh of the peach to the pit. A description of the blade carrying structure carried by shaft 73 will suffice for both blades.

Each blade is horizontally extending and opposite ends are rigid with spaced vertical end portions 100 (FIGS. 1, 6, 7) between which the peach half is adapted to be received as the peach is bisected. Said portions 100 are rigid with horizontal arms 101 projecting laterally from opposite sides of a spring containing housing 102 (FIG. 7), which housing in turn, is rigid with a sleeve 103. Sleeve 103 is adjustably secured on shaft 73.

While modifications may be made, it has been found that the position of blade 94 so that the planar surface thereof against which the peach half is positioned extends transversely across a radial line extending from the center of shaft 74 through the center of recess 99 (FIG. 3) at an angle of approximately 60 degrees at the open side of the recess. Thus the blades immediately commence moving apart upon downward movement thereof about the axes of shafts 73, 74 and yet their flat sides are tightly together when the blades are vertical as seen in FIG. 5.

Said spring housing, sleeve, arms 101 and the end portions 102 of the latter are integrally formed, and when blades 94 are flat together the said housing is below shaft 73, and the corresponding housing carried by shaft 74 is similarly below the latter.

Also rigid with the casting that includes the housing 102 are depending ears 104 (FIG. 1) between which a rocket arm 105 carries a cam follower 106 that is adapted to be engaged and to be actuated by the riser or the outer cam surface of a cam 107. This cam 107, in turn, is adjustably secured to a projection on the stationary hub through which shaft 73 extends by a screw 108 that extends through an arcuate slot in said cam into said projection, said shaft 73 rotatably extending through said cam at one side of the slot and screw 108.

The end of the rocker arm 105 that is opposite to the end carrying the cam follower 106 is formed with a recess 109 that opens toward the spring housing 102, and said housing is formed with an opening in register with the open side of said recess (FIG. 7). Within recess 109 is a brake shoe 110 having a stem 111 that slidably extends through the closed end of the recess. A spring 112 reacts between said closed end and said shoe to yieldably urge the shoe into the opening in housing 102, while lock nuts 113 on stem 111 outside said closed end of the recess function to adjust the position of the brake shoe relative to the housing 102, or to regulate the distance said shoe is adapted to project out of recess 109.

Said spring housing is formed with a cylindrical bore opening laterally outwardly of the housing 102 at one of its ends, and reciprocable within said bore is a hollow plunger 116 having an open end directed toward the closed end of the housing, and formed with a head 117 that projects from the open end of the bore in said housing 102. A helical spring 118 reacts between head 117 and the closed end of said bore to yieldably urge the plunger and its head in an outward direction out of the open end of the bore.

A side of the plunger extends across the opening into which the brake shoe 110 extends. This brake shoe normally does not engage said plunger, but when the pitting operation occurs, the follower 106 will be on the high side of cam 107 with the result that arm 105 is rocked to urge the shoe 110 tightly against said plunger for a purpose later to be described.

Also integral with the sleeve 103 are a pair of ears 119 between which is the upper end of a peach clamping member 120. A shaft 121 rotatably extends through said ears and through the upper end of a peach clamping member 120, and a set screw 123 frictionally locks the clamping member to said shaft.

Shaft 121 projects at one end toward the side 2 of the frame 1, and is formed with a right angle bend (FIGS. 1, 3, 6) at its projecting end, providing an end portion 124 that projects generally a central vertical plane midway between shafts 73, 74 or the central medial plane of the pitter in the position seen in FIG. 1. The parts above described on shaft 73 are, of course, duplicated on shaft 74. Each end portion 124 carries a cam follower 125 at its terminating end.

A cam shaft 126 rotatably extends through the front wall 2 at a point centrally between shafts 73, 74 and is supported by said wall. The forward end of said shaft carries a cam 127 that is between the cam followers 125 and that is adapted to be engaged by said followers when the shafts 73, 74 have been rotated to bring the peach clamping members 120 in positions at opposite sides of the peach holding elements 57.

At the rear side of the front wall 2 (FIG. 2), the cam shaft 126 carries a sprocket wheel 129 that is connected by a sprocket chain 130 with a sprocket wheel 131 on shaft 19. Said sprocket wheels 129 and 131 are of the same diameter, hence the cam 127 will make one revolution for each revolution of the shaft 19.

As seen in FIG. 1 the cam followers 125 are on the risers of cam 127 at points just before the rod 5 will descend to push a peach held by elements 57 downwardly for impalement on the blades 94, hence were there any halves between the clamping members and the blades, they would drop away from said blades and clamping members. A slight further rotation of cam 127 will result in the clamping members being free for movement toward the blades 94.

The last mentioned movement is due to the engagement between head 117 of the spring urged plunger 116 and the rear side of the fruit clamping member 120.

The peach clamping member 120 at each of the opposite sides of the medial vertical plane of the pitter have V-shaped opposed faces in horizontal cross sectional contour. When the cam followers 125 are free from the influence of the risers on cam 127 the V-shaped surfaces of the clamping members will yieldably engage the convex sides of a peach positioned between them, but when the cam followers are on the high sides of the cams, the peach clamping members 120 will be momentarily held in the solid line position of FIG. 1 in which position they are moved away from the peach halves. Since this is the only time in which the peach halves are not under the influence of the pressure exerted by spring 118 (FIG. 7), the halves are free to drop away from blades 94 as said blades approach face to face engaging relation.

While the various parts of the pitter hereinbefore described are synchronized to move together and substantially at the same time, except for certain dwell periods, a normal cycle of operation of the pitter may be as follows.

Assuming FIGS. 1 and 2, in full line, represent the commencement of a cycle, upon rotation of shaft 34 in the direction of the arrow (FIG. 2) the peach holding elements or members 57 will be moved forwardly to position 90 (FIG. 3) to receive a whole peach from a feeder or the peach may be manually positioned in the holder. Preferably the stem end of such peach is uppermost and the peach is oriented so its suture is in the medial vertical plane of the pitter that is between the holder members 57. The connection of links 64, 65 with gear segment 75 that, in turn, is driven by pinion 33 through gears 22, 23 cause movement of said peach holding elements.

Continued rotation of shaft 34 that carries pinion 33 causes the peaching holding elements to carry the peach to a position directly below the rod 5. This rod commences its descent so projection 92 at its lower end will enter the recess of the peach at its stem end as soon as the peach is below the rod.

Upon said projection moving down to sealing position in the recess at the stem end of the peach, the blades 93 at opposite sides of the projection will cut into the flesh of the peach at opposite sides of said projection to form cuts in the plane of the suture of the peach.

Downward movement of rod 5 is effected upon rotation of shaft 11 through connecting rod 15 that is connected by arm 16 with shaft 17. Shaft 17 is the one that is given an oscillatory movement through the travel of cam follower 26 in the cam track 25 that continuously revolves with gear 22.

The downstroke of rod 5 pushes the peach downwardly and past the lower end of the peach holder members 57 and onto the blades 94 that are flat together in the medial vertical plane of the pitter. The pit of the peach passes into the recesses 99 of the blades (FIG. 3) and the flesh of the peach is bisected by said blades. The blades 93 on the rod have already cut the skin and flesh of the peach in the same plane as blades 94 at opposite sides of the recess in the peach at its stem end.

As soon as the peach has been bisected by blades 94, the rod 5 may start its ascent back to the full line position of FIG. 1. The dwell that occurs due to the lost motion link 79 (FIG. 2) is during the period when the peach is being moved downwardly on blades 94, and then the gear segments 75, 76 will be caused to rotate for swinging the blades 94 in circular paths downwardly and away from each other as seen in FIG. 6. During this movement of the blades away from each other, the peach halves will be held against the blades by the springs 118, which exert a relatively light pressure against the holders 120.

Upon movement of the blades away from each other, the pit, if it remains whole, will remain in the pit cavity of one half or the other, according to which released its hold when the halves were moved apart. If the pit is split, then half of the pit will usually remain in each half of the peach.

The movement of the blades away from each other is in circular paths that are perpendicular to the plane of the suture of the peach at the blades, hence the force pulling the pit from one cavity or the other is one that will directly pull the pit from such cavity without causing a shifting of the pit relative to the peach halves in the plane of the suture of the peach. Thus there will be no damage to the flesh of the peach as would occur were the pit so shifted.

The shafts 18, 19 are continuously rotating, and the pit engaging members 45 are revolvable about such shafts, their being secured thereon. The movement of the pit engaging members 45 is such that the trailing end of the pit (FIGS. 8, 9) will be engaged by such member shortly before the end of the stroke of the blade 94. The circular path of travel of the blade and of the pit engaging members 45 are generally tangential at the point of engagement between the members 45 and the trailing end of the pit, therefore, the pit will be progressively lifted or forced out of the peach half starting from the trailing end of the pit, as seen in FIGS. 8, 9.

The force that is applied to the trailing end of the pit will not move the peach half on the blade 94 because the cam follower 106 (FIG. 6) will have moved onto the riser of cam 107 thus causing the brake shoe 110 to frictionally lock the spring urged cylinder 116 in a position holding the peach clamping members 120 against movement under the force applied to the peach by the pit engaging fingers 45. The fact that the peach clamping holder 120 extends across the generally leading side of the peach half serves to block the movement of the peach half when the peach clamping holder is held by the brake shoe 110.

As soon as the pit is removed from the peach half, the blades commence their return movement with the peach halves held thereon, but the peach clamping holders will be released for movement away from the peach halves as soon as the cam followers 106 move off the risers on cams 107.

Upon the blades 94 again moving together, the cam followers 125 will engage the risers on the central cam 127 to cause the peach clamping holders 120 to move away from the blades 94 to permit the halves to fall away from the blades.

The exact time when the members 120 are moved away may vary according to the adjustment of cam 127. Should the peach halves stick to the blades 94, the next peach that is bisected will push them off.

The various parts of the pitter requiring synchronized movement are provided with means for adjusting them so as to provide for the optimum speed consistent with the desired type of pitting.

From the foregoing it is seen that the method practiced is one in which a whole peach is bisected and then the halves are moved apart thereby separating the pit from one of the halves and leaving it retained in the pit cavity of the other half. Then the trailing end of the pit is engaged while the halves are moving apart, and the pit is progressively removed from the pit cavity starting with the trailing end of the peach half.

We claim:

1. A freestone drupe pitter comprising: a pair of similar, flat, parallel bisecting blades in a face to face engaging position having corresponding sharpened edges adapted to bisect the flesh of a whole drupe substantially to the pit therein, means supporting said blades in said engaging position and for movement of one blade of said pair away from the other for thereby separating one of the halves of such bisected drupe from the pit leaving the pit within the pit cavity of the other half, means connected with said one blade for so moving it away from the other, pit engaging means supported in a position adjacent to each blade, means supporting each pit engaging means in said last mentioned position and for movement into engagement with one edge of the pit within said other half of the bisected drupe and in a direction generally outwardly of said other half after its said engagement with said one edge whereby said pit will be progressively lifted out of said other half starting with said one edge, means connected with said pit engaging means for so moving the latter, and means for holding said other drupe half substantially stationary against a blade of said pair during said movement of said pit engaging means.

2. A freestone drupe pitter comprising: a frame, a pair of similar, flat, bisecting blades in face to face engaging relation formed for bisecting the flesh of a whole drupe substantially to the pit therein substantially around the latter, means on said frame supporting said blades for movement of one blade of said pair away from the other for thereby separating one of the halves of such bisected drupe from the pit leaving the pit within the pit cavity of the other half, means connected with said one blade for so moving it away from the other, drupe engaging means adjacent to such blade supported on said frame engaging each half of such bisected drupe for holding its cut face against each blade during movement of said one blade away from the other, a pair of pit engaging means respectively supported on said frame in positions adjacent to each blade and for movement into engagement with one edge of a pit that may be in the pit cavity in either of the halves of the bisected drupe and generally outwardly of said pit whereby a pit so engaged will be progressively moved out of said last mentioned pit cavity from the edge so engaged by said pit engaging means to the opposite edge thereof, and means connected with said pit engaging means for moving them into engagement with such pit and outwardly of said pit cavity.

3. In a freestone drupe pitter including a pair of blades in face to face engaging relation adapted to bisect a whole freestone drupe to the pit and to engage the cut faces of the halves of such drupe when the flesh of the latter is so bisected, means supporting said blades in said face to face engaging relation and for simultaneous movement away from each other along separate paths of travel, fruit clamping means engageable with the convex sides of said halves for holding said halves against said blades during said movement, means connecting said fruit clamping means with said blades for moving them with said blades, pit engaging means respectively adjacent to said separate paths of travel, means supporting said pit engaging means adjacent to said separate paths of travel and for movement into engagement with one edge of a pit held in the pit cavity in one of said halves after said separation of said blades and for further movement in a direction outwardly of such pit cavity for progressively moving said pit out of said pit cavity from said one edge toward the opposite edge of said pit.

4. A freestone drupe pitter comprising: a pair of blades in face to face engaging relation adapted to bisect a whole freestone drupe substantially to the pit therein and to engage the cut faces of such drupe when the latter is so bisected, means supporting said blades in such face to face engaging relation and for simultaneous movement away from each other in circular substantially tangential paths whereby the pit within said drupe will be removed from one of the halves and will remain in the pit cavity of the other half with one edge of the pit leading the opposite edge thereof during movement with the blade against said other of said halves, means connected with said blades for so moving them, clamping means connected with said blades for movement therewith and in positions clamping each of said halves against one of said blades during movement of said blades apart, separate pit engaging means adjacent to each of said circular paths supported for movement in separate circular paths substantially tangential to each of said first mentioned circular paths and for movement into and out of the pit cavity of each of said halves clamped against said blades, commencing at the trailing end of each pit cavity, for engaging the trailing edge of a pit in the pit cavity having a pit therein and for removing such pit in a direction outwardly of said cavity, means connected with said pit engaging means for so moving them.

5. A freestone drupe pitter comprising: a pair of blades in face to face engaging relation adapted to bisect a whole freestone drupe substantially to the pit therein and to engage the cut faces of such drupe when the latter is so bisected, means supporting said blades in said face to face engaging relation and for simultaneous movement away from each other in circular substantially tangential paths whereby the pit within said drupe will be removed from one of the halves and will remain in the pit cavity of the other half with one edge of the pit leading the opposite edge thereof during movement with the blade against said other of said halves, means connected with said blades for so moving them, clamping means connected with said blades for movement therewith and in positions clamping each of said halves against one of said blades during movement of said blades apart, separate pit engaging means adjacent to each of said circular paths supported for movement in separate circular paths substantially tangential to each of said first mentioned circular paths and for movement into and out of the pit cavity of each of said halves at the trailing end thereof for engaging the trailing edge of a pit in the pit cavity having a pit therein and for removing such pit in a direction outwardly of said cavity, means connected with said pit engaging means for so moving them, spring urged means engaging said clamping means for yieldably urging the latter into yieldable engagement with the convex sides of the drupe halves urging each of said drupe halves against one of said blades and a spring connected with said spring urged means for yieldably urging it against said clamping means, means supported for movement into holding relation to said yieldably urged means upon movement of said pit engaging means with said pit for holding said spring urged means stationary during movement of said pit engaging means for removing said pit whereby the drupe half engaged by said yieldably urged means will be held stationary during the removal of said pit by said pit engaging means.

6. A freestone drupe pitter comprising: a pair of blades in face to face engaging relation adapted to bisect a whole freestone drupe substantially to the pit therein and to support the cut faces of the halves of the drupe so bisected against said blades at opposite sides of the pair thereof, means supporting said blades in said face to face engaging relation and for simultaneous movement away from each other in circular substantially tangential paths of travel whereby the pit within the drupe will be removed from one of the halves and will remain in the pit cavity of the other half, means connected with said blades for so moving them and peach clamping means connected with said blades for movement therewith, means supporting said clamping means for movement into and out of engagement with the convex sides of said halves for clamping said halves against said blades during movement of said blades in said paths and for releasing said halves from said blades and yieldable means engaging said clamping means for so moving the latter into said clamping relation to said halves, pit engaging means at a point along each of said circular paths of travel respectively movable into engagement with the pit that may be in either drupe half carried against either blade of said pair, for removing such pit from said half, means supporting said pit engaging means for said movement and in a position for so engaging such pit and means connected with said pit engaging means for so moving them.

7. A freestone drupe pitter comprising: a pair of blades in face to face engaging relation adapted to bisect a whole freestone drupe substantially to the pit therein and to support the cut faces of the halves of the drupe so bisected against said blades at opposite sides of the pair thereof, means supporting said blades in said face to face engaging relation and for simultaneous movement away from each other in circular substantially tangential paths of travel whereby the pit within the drupe will be removed from one of the halves and will remain in the pit cavity of the other half, means connected with said blades for so moving them and peach clamping means connected with said blades for movement therewith, means supporting said clamping means for movement into and out of engagement with the convex sides of said halves for clamping said halves against said blades during movement of said blades in said paths and for releasing said halves from said blades and yieldable means engaging said clamping means for so moving the latter into said clamping relation to said halves, pit engaging means at a point along each of said circular paths of travel respectively movable into engagement with the pit that may be in either drupe half carried against either blade of said pair, for removing such pit from said half, means supporting said pit engaging means for said movement and in a position for so engaging such pit and means connected with said pit engaging means for so moving them, clamp releasing means connected with said clamping means actuatable after said pit engaging means has engaged and removed said pit for moving said clamping means away from said peach halves to release the latter for falling from said blades, and means supported adjacent to said clamping means engageable with said clamp releasing means after said pit has been removed for actuating said clamp releasing means for so moving said clamping means out of engagement with said halves.

8. A pitter for removing the pit from the pit cavity of one half of a bisected freestone drupe having a planar cut face around said pit comprising: a bisecting blade having a planar surface against which said cut face is adapted to be held and formed with a recess through which said pit is exposed when said cut face is against said surface, blade supporting means supporting said blade for movement in one direction in a circular path with said surface disposed in a plane extending transversely across a radial line from the center of said path and generally facing said center, whereby one edge of said pit will lead the other during movement in said one direction in said path, means connected with said blade supporting means for moving the latter to carry said blade along said circular path in said one direction, pit engaging means adjacent to said path, means supporting said pit engaging means for movement in a circular path generally tangential to the path of said blade and into engagement with one of the edges of a pit exposed through said recess upon movement of said blade in said path for removing said pit from a peach half carried against said blade, and means connected with said blade for movement therewith for so holding a peach half against said blade during said movement of said blade in said circular path and means connected with said pit engaging means for moving it in its said circular path in the same direction as the direction of movement of said blade for engaging the trailing edge of the pit exposed through said recess.

9. A pitter for removing the pit from the pit cavity of one half of a freestone drupe having a planar cut face around said pit comprising: a pair of vertically disposed bisecting blades in face to face engagement and having upwardly facing sharpened edges for bisecting a whole peach, said pair being formed with an upwardly opening pit receiving recess, a peach holder horizontally reciprocable between a position laterally offset relative to said blades to a position over said blades, said holder including means for holding a whole peach for carrying a whole peach to a position centered over said blades, means supporting said holder for said movement and means connected with said holder for so moving it, vertically reciprocable means over said blades movable downwardly for engaging a peach in said holder and for moving such peach onto said blades and for moving the pit in such peach into said recess, means supporting said vertically reciprocable means for said movement, and means connected with said vertically reciprocable means for so moving it, means connected with said blades for moving them apart after such peach is on said blade for separating the halves bisected by said pair of blades and for separating the pit from one of said halves, means supporting said blades for said movement, pit removing means engageable with the pit carried by one of said halves movable upon engagement with such pit for pulling said pit out of said half, means supporting said pit removing means for said movement and means connected with said pit removing means for so moving it.

10. A freestone drupe pitter comprising: a pair of similar, flat, parallel bisecting blades in face to face engaging position having corresponding sharpened edges adapted to bisect the flesh of a whole drupe substantially to the pit therein, means supporting said blades in said engaging position and for movement of said blades apart in corresponding arcuately extending paths of travel with the oppositely outwardly facing sides of said pair of blades in leading relation and which paths terminate in generally upwardly extending directions, means connected with said blades for so moving them, drupe engaging means movable with said blades for releasably holding one of the drupe halves of a drupe bisected by said blades against the leading side of each of said blades during said movement, pit engaging means supported in a position adjacent to each blade, means supporting each pit engaging means adjacent to said terminating end of the arcuate path of each blade for movement into engagement with one of the edges of pit halves in the drupe halves held against said blades and for movement generally downwardly relative to said terminating end of each path for moving the pit halves out of said drupe halves, and means connected with said pit engaging means for so moving them.

References Cited in the file of this patent

UNITED STATES PATENTS

| | | |
|---|---|---|
| 921,523 | Dunkley | May 11, 1909 |
| 2,380,530 | Jepson | July 31, 1945 |
| 2,629,417 | Harrer | Feb. 24, 1953 |
| 2,799,311 | Waters | July 16, 1957 |
| 2,818,098 | Perrelli | Dec. 31, 1957 |
| 2,924,259 | Magnuson | Feb. 9, 1960 |
| 2,943,659 | Anderson | July 5, 1960 |
| 2,975,812 | Perrelli | Mar. 21, 1961 |